United States Patent [19]

Auerbach et al.

[11] Patent Number: 4,840,642
[45] Date of Patent: Jun. 20, 1989

[54] MONOAZO COMPOUNDS HAVING A 6-(5'-CHLORO-2',4'-DIFLUOROPYRIMID-6'-YLAMINO)-1-HYDROXY-3-SULFONAPH-THALENE GROUP AND THEIR USE AS DYES

[75] Inventors: Günther Auerbach, Basel; Helmut A. Moser, Oberwil, both of Switzerland

[73] Assignee: Sandoz Ltd., Basel, Switzerland

[21] Appl. No.: 93,335

[22] Filed: Sep. 4, 1987

[30] Foreign Application Priority Data

Sep. 9, 1986 [DE] Fed. Rep. of Germany ....... 3630615

[51] Int. Cl.⁴ ............ C09B 29/16; C09B 62/24; D06P 3/32; C07D 239/42
[52] U.S. Cl. .................. 8/549; 8/437; 8/681; 8/689; 8/917; 8/918; 8/924; 534/632; 534/638; 534/751; 534/798; 534/803; 534/839; 534/885
[58] Field of Search ............ 534/63 D, 632, 638; 8/549, 689, 549, 681, 689

[56] References Cited

U.S. PATENT DOCUMENTS

| | | | |
|---|---|---|---|
| 3,523,115 | 8/1970 | Grandjean | 8/549 |
| 4,089,895 | 5/1978 | Jager | 260/509 |
| 4,435,181 | 3/1984 | Hoguet et al. | 8/527 |
| 4,602,915 | 7/1986 | Wolff et al. | 8/527 |
| 4,647,286 | 3/1987 | Seitz | 8/549 |

FOREIGN PATENT DOCUMENTS 3400411 7/1985 Fed. Rep. of Germany .

Primary Examiner—A. Lionel Clingman
Attorney, Agent, or Firm—Gerald D. Sharkin; Richard E. Vila; Melvyn M. Kassenoff

[57] ABSTRACT

Compounds of the formula

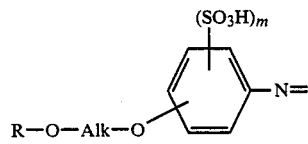
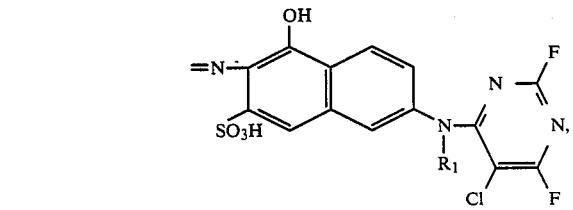

and salts thereof, useful for dyeing and printing hydroxy group - or nitrogen-containing organic substrates, for example, leather and fibrous materials containing or consisting of natural or synthetic polyamides or natural or regenerated cellulose; preferably textile material containing or consisting of cotton which is preferably dyed using the exhaust dyeing method.

20 Claims, No Drawings

MONOAZO COMPOUNDS HAVING A 6-(5'-CHLORO-2',4'-DIFLUOROPYRIMID-6'-YLAMINO)-1-HYDROXY-3-SULFONAPHTHALENE GROUP AND THEIR USE AS DYES

The invention relates to monoazo compounds containing a heterocyclic fibre-reactive group and to a process for their preparation. These compounds are suitable for use as fibre-reactive dyestuffs.

More particularly, this invention provides compounds of formula I

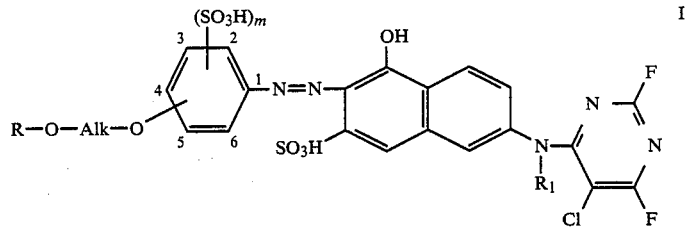

in free acid or salt form, in which m is 0, 1 or 2,

Alk is a linear or branched $C_{2-3}$ alkylene radical,

R is hydrogen, sulpho, $C_{1-4}$ alkyl or $C_{2-4}$ hydroxyalkyl, and $R_1$ is hydrogen, methyl or ethyl, and mixtures of compounds of formula I and salts thereof.

Any unsubstituted or substituted alkyl as R is linear or branched. Any unsubstituted alkyl as R is preferably methyl or ethyl, especially methyl. Any hydroxy-substituted alkyl as R is preferably 2-hydroxyethyl.

R is preferably $R_a$, where $R_a$ is hydrogen, sulpho, methyl, ethyl or 2-hydroxyethyl. More preferably, it is $R_b$, where $R_b$ is hydrogen, sulpho or methyl. Even more preferably, it is $R_c$, where $R_c$ is hydrogen or sulpho. Most preferably, R is hydrogen.

Any —$C_{2-3}$alkylene- is preferably a linear $C_{2-3}$alkylene radical, more preferably an ethylene radical.

m is preferably 0 or 1, most preferably 1.

Preferred compounds of formula I are those wherein R is $R_a$ and m is 0 or 1, with those of this group wherein Alk is —CH$_2$CH$_2$— being more preferred.

Any sulpho and —O—Alk—OR groups as substituents of the phenyl diazo component are preferably in the positions as follows:
(related to the azo group in the 1-position; and —O—Alk—OR is represented by Y)

(a) m is 0
Y is in the 2- or 4-position, especially in the 4-position.

(b) m is 1
The sulpho group and Y are in the positions 2 and 4; 2 and 5; 3 and 4; or 3 and 5. More preferably, the sulpho group is in the 2- or 3-position, especially in the 2-position, and Y is in the 4- or 5-position, especially in the 4-position.

(c) m is 2
The sulpho groups and Y are in the positions 2, 4 and 5, and most preferably, Y is in the 4-position.

$R_1$ is preferably hydrogen or methyl, most preferably it is hydrogen.

Preferred compounds correspond to formula Ia,

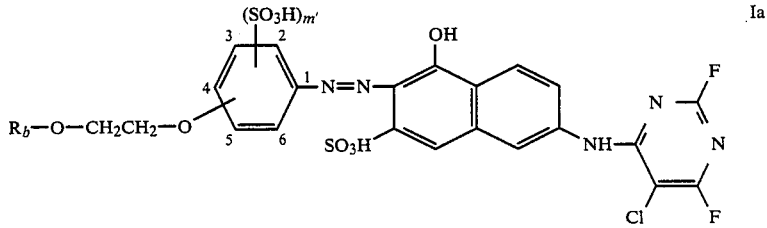

in which m' is 0 or 1, which compounds are in free acid or salt form.

More preferred are compounds of formula Ia in which (1) m' is 1;
(2) $R_b$ is $R_c$;
(3) those of (1) or (2) in which the sulpho group is in the 2- or 3-position;
(4) those of (3) in which the sulpho group is in the 2-position;
(5) those of (3) or (4) in which the —OCH$_2$CH$_2$OR$_b$ group is in the 4-position;
(6) those of (1) to (5) in which $R_b$ is hydrogen;
(7) those of (2) wherein m' is 1;
(8) those of (7) wherein the sulpho group is in the 2-position and the —OCH$_2$CH$_2$OR$_b$ group is in the 4-position; and
(9) those of (4) wherein $R_b$ is hydrogen.

When a compound of formula I or Ia is in salt form, the cations associated with the sulpho groups is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetramethylammonium, triethylamonium mono-, di- and tri-ethanolammonium.

The preferred cations are the alkali metal cations and ammonium, with sodium being the most preferred.

In a compound of formula I or Ia the cations of the sulpho groups can be the same or different, e.g., they can also be a mixture of the above mentioned cations meaning that the compound of formula I or Ia can be in mixed salt form.

The present invention further provides a process for the preparation of the compounds of formula I or a mixtures thereof comprising reacting the diazonium salt of an amino compound of formula II,

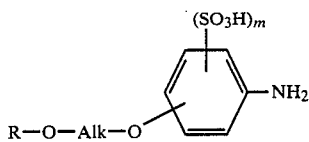

in which R, Alk and m are as defined above, or a mixture thereof which compound(s) are in free acid or salt form, with a compound of formula III,

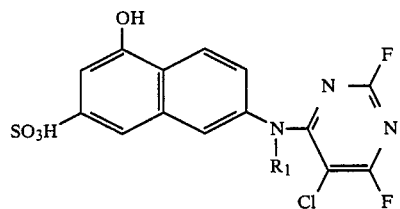

in which $R_1$ is as defined above, or a mixture thereof, which compound is in free acid or salt form.

The diazotization and coupling reactions may be carried out in accordance with conventional methods. The coupling reaction is preferably carried out using a weakly acid to weakly alkaline reaction medium.

The compounds of formula I may be isolated in accordance with known methods, for example, by conventional salting out with alkali metal salt, filtering and drying optionally in vacuo.

Depending on the reaction and isolation conditions the compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

The starting compounds of formulae II and III are either known or may be prepared in accordance with known methods using appropriate starting materials.

The compounds of formula II, for example, may be prepared reacting (i) a compound of formula IVa

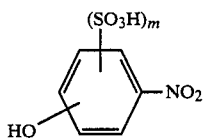

in which m is 0, 1 or 2, with an appropriate chlorohydrin compound such as ethylene chlorohydrin, propylene chlorohydrin or epichlorohydrin, optionally alkylating the condensation product to introduce a group $R_x$ which is $C_{1-4}$alkyl or $C_{2-4}$hydroxyalkyl, and subsequently reducing the nitro group in conventional manner, or (ii) a compound of formula IVb

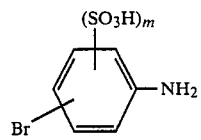

in which m is 0, 1 or 2, with an appropriate alkanediol HO—Alk—OH or a derivative thereof having the formula HO—Alk—OR$_x$ in which Alk is a linear or branched $C_{2-3}$alkylene radical and $R_x$ is as defined above, in the presence of a mixture of copper powder and copper salt, and optionally sulphating a compound obtained according to (i) or (ii) containing a terminal hydroxy group to obtain a compound of formula II in which R is sulpho.

The starting compounds of formulae IVa and IVb are either known or may be prepared in accordance with known methods.

The compounds of formula I and mixtures thereof are useful as fibre-reactive dyestuffs for dyeing or printing hydroxy group- or nitrogen-containing organic substrates. Preferred substrates are leather and fibre materials containing or consisting of natural or synthetic polyamides and, particularly, of natural or regenerated cellulose such as cotton, viscose and spun rayon. The most preferred substrate is textile material containing or consisting of cotton.

Dyeing or printing is effected in accordance with known methods conventional in the fibre-reactive dyestuff field. However, for the compounds of formula I it is preferred to use the exhaust dyeing method. The most favourable and therefore preferred dyeing temperature is within the range of 30° to 60° C.

The compounds of this invention are well compatible with other fibre-reactive dyes; they may be applied per se or in combination with appropriate fibre-reactive dyestuffs of the same class having analogous dyeing properties, e.g., concerning common fastness properties, extent of ability to exhaust from the dyebath onto the fibre etc. The dyeings obtained with such combination mixtures have good fastness properties and are comparable to those obtained with a single dyestuff.

In view of their notable build-up power the compounds of formula I give high exhaust and fixation yields. The portion of unfixed dye can be easily washed off the substrate. Furthermore, these compounds show only low sensitivity to the addition of salt, i.e., their water-solubility will not change when adding necessary amounts of salt to the dyebath. The dyeings obtained have particularly good light fastness (dry and wet), but also good wet fastness properties such as wash, water, sea water and sweat fastness. They are stable to oxidative influences, e.g., chlorinated water, hypochlorite bleach and peroxide or perborate-containing wash liquors.

The following examples further serve to illustrate the invention. In the examples all parts and percentages are by weight or volume. The temperatures are in degrees Centigrade.

EXAMPLE 1

21.9 Parts of 4-nitrophenol-3-sulphonic acid are dissolved in 350 parts water. To this solution which is heated to 95°, 12 parts of ethylene chlorohydrin are added portionwise over a period of 60 minutes. The pH of the reaction mixture is kept at 8.0–8.2 by adding 38 parts of 30% sodium hydroxide solution.

22 parts of iron powder and 4 parts of 30% hydrochloric acid in 50 parts water are heated to 80° for ten minutes. Subsequently, the solution of the nitrophenol compound prepared above is added portionwise during 50 minutes. The reaction mixture is adjusted to a brilliant-yellow-alkaline pH by sprinkling 6 parts of sodium carbonate into the mixture and is filtered in order to separate the reaction product from the iron mud. The filtrate is cooled to 5°, and the crystalline mass which precipitates is isolated and dried. The amino compound (A) thus obtained is dissolved in 200 parts water. To this solution 25 parts of 30% hydrochloric acid are added. Diazotization is effected at 0°–5° by adding 6.9 parts of sodium nitrite in 24 parts water.

23.9 Parts of 2-amino-5-hydroxynaphthalene-7-sulphonic acid are stirred in 400 parts water at 25° and dissolved by adding 13 parts of 30% sodium hydroxide solution. To this solution 17 parts of 5-chloro-2,4,6-trifluoropyrimidine are added portionwise within 40 minutes. By the addition of 15 parts of 20% sodium carbonate solution the pH is kept at 4.0. The diazonium salt solution as prepared above is then added at 5°–10°, and simultaneously the pH is adjusted to 6.5–7.5 by the addition of dilute sodium carbonate solution. The resulting dyestuff is salted out by adding sodium chloride and isolated in conventional manner. The dyestuff having the formula (in free acid form),

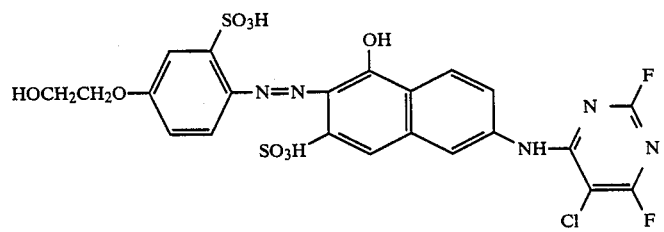

when dried is obtained as a dark red powder which is well soluble in water showing a red colour. It dyes cotton a scarlet shade. These cotton dyeings show good light fastness and wet fastness properties.

EXAMPLE 2

If the dried amino compound (A) prepared according to the method described in Example 1 is sulphated prior to the diazotization using sulphuric acid monohydrate at 10°–20° and coupled in analogous manner as described in Example 1, the dyestuff having the formula (in free acid form)

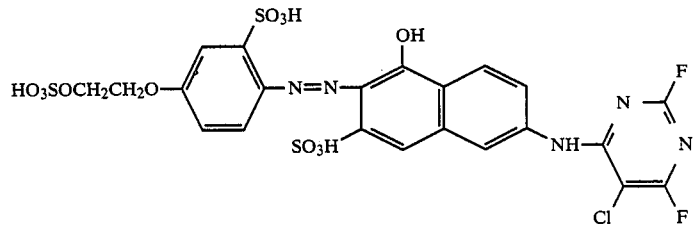

is obtained having a good water-solubility. It dyes cotton a scarlet shade. The cotton dyeings obtained show good light fastness and other general fastness properties.

EXAMPLES 3 TO 27

By analogy with the method described in Example 1 or 2, using appropriate starting compounds, further compounds of formula I can be prepared which are listed in the following Table. They correspond to the formula

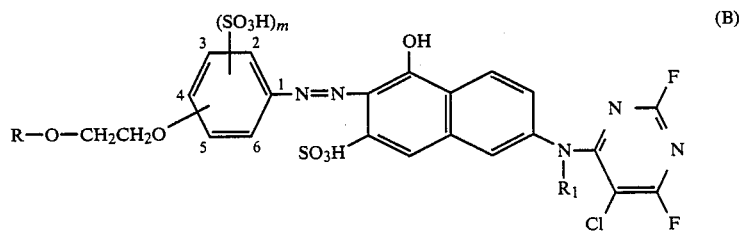

in which the symbols are defined in the Table.

Compounds of formula (B) in which R is methyl or ethyl (Examples 12, 13, 22, 23 and 27) may be prepared by analogy with the method described in Example 1 but alkylating the reaction product of the corresponding nitrophenolsulphonic acid with ethylene chlorohydrin (see first step of Example 1) in conventional manner before reducing the nitro group.

In the last column I of this Table the shade of each cotton dyeing is given whereby a is scarlet, and
b is orange.

The cotton dyeings thus obtained show good general fastness properties such as light- and wet-fastnesses.

Table/Compounds of formula B

| Ex. No. | m | SO$_3$H in position | R | —OC$_2$H$_4$OR in position | R$_1$ | I |
|---|---|---|---|---|---|---|
| 3 | 1 | 3 | H | 4 | H | a |
| 4 | 1 | 3 | SO$_3$H | 4 | H | a |
| 5 | 1 | 4 | H | 2 | H | a |
| 6 | 1 | 2 | H | 4 | CH$_3$ | a |
| 7 | 1 | 2 | SO$_3$H | 4 | CH$_3$ | a |
| 8 | 1 | 3 | H | 4 | CH$_3$ | a |
| 9 | 1 | 4 | SO$_3$H | 2 | H | a |
| 10 | 1 | 2 | H | 5 | H | b |
| 11 | 1 | 5 | H | 2 | H | a |
| 12 | 1 | 3 | CH$_3$ | 4 | H | a |
| 13 | 1 | 2 | CH$_3$ | 4 | H | a |
| 14 | 1 | 2 | SO$_3$H | 5 | H | b |
| 15 | 0 | — | H | 4 | H | a |
| 16 | 0 | — | SO$_3$H | 4 | H | a |
| 17 | 2 | 2,5 | SO$_3$H | 4 | H | a |
| 18 | 2 | 2,5 | H | 4 | H | a |
| 19 | 1 | 2 | H | 4 | C$_2$H$_5$ | a |
| 20 | 0 | — | H | 4 | C$_2$H$_5$ | a |
| 21 | 2 | 2,5 | SO$_3$H | 4 | CH$_3$ | a |
| 22 | 1 | 3 | C$_2$H$_5$ | 4 | H | a |
| 23 | 1 | 3 | C$_2$H$_5$ | 4 | C$_2$H$_5$ | a |
| 24 | 0 | — | H | 2 | H | a |
| 25 | 0 | — | SO$_3$H | 2 | H | a |
| 26 | 0 | — | SO$_3$H | 4 | CH$_3$ | a |
| 27 | 1 | 2 | C$_2$H$_5$ | 4 | C$_2$H$_5$ | a |

In accordance with the method described the dyestuffs of Examples 1 to 27 are obtained in sodium salt form. They may, depending on the reaction/isolation conditions or by reacting the sodium salts in accordance with known methods, also be obtained in free acid form or in other salt forms, for example those salt forms containing one or more cations indicated in the description above.

In the following examples the application of the compounds of this invention is illustrated.

APPLICATION EXAMPLE A (EXHAUST DYEING)

0.3 Parts of the dyestuff of Example 1 are dissolved in 300 parts of demineralised water and 15 parts of Glauber's salt (calcined) are added. The dyebath is heated to 40°, then 10 parts of cotton fabric (bleached) are added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 parts of a commercially available anion-active detergent. After rinsing with running hot water (for 3 minutes) and centrifuging, the dyeing is dried in a cabinet dryer at ca. 70°. A scarlet cotton dyeing is obtained which shows good light fastness and wet fastness properties that is resistant to oxidative influences.

APPLICATION EXAMPLE B (ALL-IN-PROCESS)

To a dyebath containing 10 parts of Glauber's salt (calcined) in 300 parts of demineralized water, 10 parts of cotton fabric (bleached) are added. The bath is heated to 40° within 10 minutes, and then 0.5 parts of the dyestuff of Example 1 are added. After a further 30 minutes at 40°, 3 parts of sodium carbonate (calcined) are added, and dyeing is continued for 45 minutes at 40°.

The dyed fabric is rinsed with running cold water, then hot water, and is washed according to the method given for Application Example A. After rinsing and drying a scarlet cotton dyeing is obtained showing the same properties as indicated in Application Example A.

APPLICATION EXAMPLE C (PRINTING)

A printing paste consisting of

| | |
|---|---|
| 40 parts of the dyestuff of Example 17 | |
| 100 parts of urea | |
| 340 parts of water | |
| 500 parts of a 4% sodium alginate thickener and | |
| 20 parts of sodium carbonate | |
| 1000 parts | | is applied to cottom fabric in accordance with a conventional printing method.

The printed fabric is dried and fixed in steam at 105° for one minute. It is then rinsed in hot water, washed at the boil (according to the method described in Application Example A) and dried. A scarlet print is obtained which has good general fastness properties being stable to oxidative influences.

Similarly, the dyestuffs of the other examples or mixtures of the dyestuffs of Examples 1 to 27 may be employed to dye or print cotton in accordance with the method given for Application Examples A to C.

What is claimed is:

1. A compound of the formula

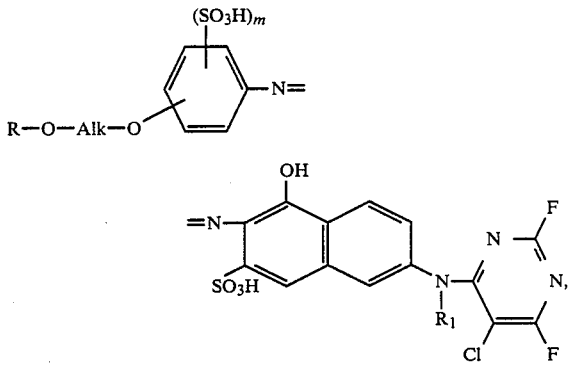

or a water-soluble salt thereof each cation of which is independently a non-chromophoric cation, wherein Alk is linear or branched C$_{2-3}$alkylene,
R is hydrogen, sulfo, C$_{1-4}$alkyl or C$_{2-4}$hydroxyalkyl,
R$_1$ is hydrogen, methyl or ethyl, and
m is 0 or 1,
or a mixture of such compounds or salts.

2. A compound according to claim 1, or a water-soluble salt thereof each cation of which is independently a non-chromophoric cation.

3. A compound according to claim 2, or a water-soluble salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

4. A compound according to claim 3, or a water-soluble salt thereof each cation of which is independently lithium, sodium, potassium or ammonium.

5. A compound according to claim 4, or a sodium salt thereof.

6. A compound according to claim 2, or a water-soluble salt thereof each cation of which is independently a non-chromophoric cation, wherein Alk is linear $C_{2-3}$alkylene.

7. A compound according to claim 2, or a water-soluble salt thereof each cation of which is independently a non-chromophoric cation, wherein m is 1.

8. A compound according to claim 2, or a water-soluble salt thereof each cation of which is independently a non-chromophoric cation, wherein R is hydrogen, sulfo, methyl, ethyl or 2-hydroxyethyl.

9. A compound according to claim 8, or a water-soluble salt thereof each cation of which is independently a non-chromophoric cation, wherein Alk is $-CH_2CH_2-$.

10. A compound according to claim 2, or a water-soluble salt thereof each cation of which is independently a non-chromophoric cation, wherein $R_1$ is hydrogen or methyl.

11. A compound according to claim 10, or a water-soluble salt thereof each cation of which is independently a non-chromophoric cation, wherein Alk is linear $C_{2-3}$alkylene, and
R is hydrogen, sulfo, methyl, ethyl or 2-hydroxyethyl.

12. A compound according to claim 11 having the formula

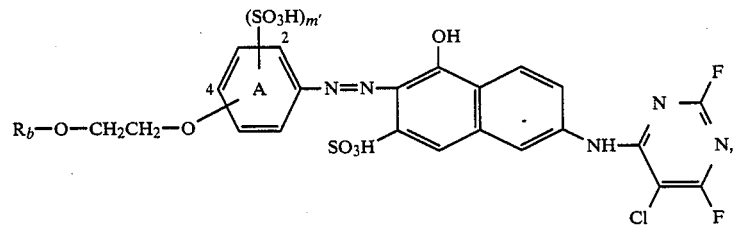

or a water-soluble salt thereof each cation of which is independently a non-chromophoric cation, wherein $R_b$ is hydrogen, sulfo or methyl, and m' is 0 or 1.

13. A compound according to claim 12, or a water-soluble salt thereof each cation of which is independently a non-chromophoric cation, wherein $R_b$ is hydrogen or sulfo.

14. A compound according to claim 13, or a water-soluble salt thereof each cation of which is independently a non-chromophoric cation, wherein m' is 1.

15. A compound according to claim 14, or a water-soluble salt thereof each cation of which is independently a non-chromophoric cation, wherein the sulfo group on Ring A is in the 2-position, and
the $R_b-O-CH_2CH_2-O-$ group is in the 4-position.

16. The compound according to claim 15 having the formula

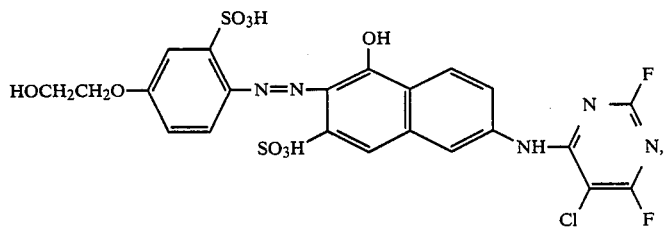

or a water-soluble salt thereof each cation of which is independently a non-chromophoric cation.

17. The compound according to claim 16 in sodium salt form.

18. A process for dyeing or printing an hydroxy group- or nitrogen-containing organic substrate comprising applying to an hydroxy group- or nitrogen-containing organic substrate, as a dyeing or printing agent, a compound according to claim 1, a salt thereof each cation of which is independently a non-chromophoric cation or a mixture of such compounds or salts.

19. A process according to claim 18 wherein the substrate is a fiber material comprising natural or regenerated cellulose.

20. A process according to claim 19 wherein the substrate is a textile material comprising cotton.